(12) United States Patent
Fujiwara et al.

(10) Patent No.: US 8,304,484 B2
(45) Date of Patent: Nov. 6, 2012

(54) GLASS COMPOSITION

(75) Inventors: Kosuke Fujiwara, Tokyo (JP); Akihiro Koyama, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 305 days.

(21) Appl. No.: 12/665,439

(22) PCT Filed: Jun. 17, 2008

(86) PCT No.: PCT/JP2008/061060
§ 371 (c)(1),
(2), (4) Date: Dec. 18, 2009

(87) PCT Pub. No.: WO2008/156091
PCT Pub. Date: Dec. 24, 2008

(65) Prior Publication Data
US 2010/0160528 A1    Jun. 24, 2010

(30) Foreign Application Priority Data

Jun. 18, 2007  (JP) .................. 2007-160112

(51) Int. Cl.
| | |
|---|---|
| C08K 7/14 | (2006.01) |
| C08K 7/20 | (2006.01) |
| C08K 7/28 | (2006.01) |
| C08K 3/40 | (2006.01) |
| C08K 7/22 | (2006.01) |
| C03C 6/02 | (2006.01) |
| C03C 3/076 | (2006.01) |
| C03C 3/083 | (2006.01) |
| C03C 3/087 | (2006.01) |

(52) U.S. Cl. .......... 524/494; 524/492; 524/493; 501/27; 501/33; 501/35; 501/53; 501/55; 501/68; 501/69; 501/70; 501/72; 501/153; 501/154; 501/900; 501/903

(58) Field of Classification Search ............ 501/27, 501/33, 35, 53, 55, 68, 69, 70, 72, 153, 154, 501/900, 903; 524/492, 493, 494
See application file for complete search history.

(56) References Cited

U.S. PATENT DOCUMENTS
4,542,106 A      9/1985 Sproull
2001/0055930 A1*  12/2001 Ott et al. .................. 445/9
(Continued)

FOREIGN PATENT DOCUMENTS
CN       1189517 A       8/1998
(Continued)

OTHER PUBLICATIONS

Machine Translation of JP 2006-169324A (Published Jun. 2006).*
(Continued)

*Primary Examiner* — Ling Choi
*Assistant Examiner* — Darcy D LaClair
(74) *Attorney, Agent, or Firm* — Marsh Fischmann & Breyfogle LLP

(57) ABSTRACT

Disclosed is a glass composition having a stable quality, which can be easily obtained. This glass composition can be used as a glass filler to be blended into a polycarbonate resin, and enables to reduce the load imposed on a glass manufacturing apparatus. Specifically, this glass composition contains, in mass %, $50 \leq SiO_2 \leq 60$, $8 \leq Al_2O_3 \leq 15$, $0 \leq MgO \leq 10$, $5 \leq CaO < 21$, $0 < SrO+BaO \leq 25$, $10 < MgO+SrO+BaO \leq 30$, $0 \leq Li_2O+Na_2O+K_2O < 2$, $2 < TiO_2 \leq 10$ and $0 \leq ZrO_2 < 2$ and does not substantially contain $B_2O_3$, F, and ZnO.

7 Claims, 4 Drawing Sheets

U.S. PATENT DOCUMENTS

| | | | |
|---|---|---|---|
| 2003/0050173 A1* | 3/2003 | Lin | 501/70 |
| 2005/0049133 A1 | 3/2005 | Fujiwara et al. | |
| 2007/0112123 A1* | 5/2007 | Sekine | 524/494 |
| 2007/0179237 A1 | 8/2007 | Sekine | |
| 2008/0124559 A1 | 5/2008 | Fujiwara et al. | |
| 2009/0286440 A1 | 11/2009 | Lecomte et al. | |
| 2010/0029830 A1 | 2/2010 | Fujiwara et al. | |
| 2010/0183737 A1 | 7/2010 | Fujiwara et al. | |

FOREIGN PATENT DOCUMENTS

| | | | |
|---|---|---|---|
| JP | 62-1338 B2 | | 1/1987 |
| JP | 5-155638 A | | 6/1993 |
| JP | 05155638 A | * | 6/1993 |
| JP | 6-136180 A | | 5/1994 |
| JP | 2005-097080 A | | 4/2005 |
| JP | 2006-022235 A | | 1/2006 |
| JP | 2006-022236 A | | 1/2006 |
| JP | 2006-169324 A | | 6/2006 |
| JP | 2006169324 A | * | 6/2006 |
| JP | 2007-153729 A | | 6/2007 |
| WO | 2005-110695 A1 | | 11/2005 |
| WO | 2006-064164 A1 | | 6/2006 |
| WO | 2006-068255 A1 | | 6/2006 |

OTHER PUBLICATIONS

Machine Translation of JP 05-155638A (Published Jun. 1993).*

Office Action pertaining to U.S. Appl. No. 12/529,699 having a mailing date of Sep. 7, 2011.

Reply to Office Action pertaining to U.S. Appl. No. 12/529,699 submitted on Dec. 7, 2011.

* cited by examiner

GLASS COMPOSITION

TECHNICAL FIELD

The present invention relates to glass compositions, and more particularly, to a glass composition optimal for use as a glass filler mixed with a polycarbonate resin.

BACKGROUND ART

A polycarbonate resin is a polycarbonate ester obtained from the reaction of bisphenol A (2,2-bis-(4-hydroxyphenyl) propane) with phosgene or carbonate ester. In comparison with other resins, polycarbonate resins have superior mechanical strength, impact resistance, heat resistance, and transparency. Thus, polycarbonate resins have been used as an engineering plastic in, for example, electrical devices, automobile components, and construction material.

A filler may be mixed with a polycarbonate resin to further improve the mechanical strength or heat resistance of the polycarbonate resin. Normally, glass fillers having the form of flakes, fibers, particles, beads, and the like are used to reinforce a thermoplastic plastic or the like. Preferable glass compositions include an alkali-free silicate glass such as an E glass, an alkali silicate glass such as a C glass, and a normal sheet glass.

However, when using these glass compositions as the glass filler to be mixed with polycarbonate resin, the performance of the polycarbonate resin may be adversely affected. More specifically, when using a C glass composition or a sheet glass composition, the alkali ions in these compositions may cause hydrolytic reaction that decreases the molecular weight of the polycarbonate resin. This reduces the mechanical strength of a product molded from the polycarbonate resin. Further, when using an E glass composition, the difference in refractive index between the polycarbonate resin and the glass filler scatters light at the interface of the polycarbonate resin and the glass filler. As a result, the transparency of the polycarbonate resin may be degraded.

Nowadays, glass fillers suitable for mixing with a polycarbonate resin have become practical.

Japanese Examined Patent Publication No. 62-1338 discloses a glass fiber composition consisting of glass having a refractive index that is close to that of a polycarbonate resin so that the transparency of the polycarbonate resin is not degraded.

Japanese Laid-Open Patent Publication No. 5-155638 discloses a glass composition that has a refractive index of 1.570 to 1.600 and is only subtly colored. Moreover, decrease of the molecular weight of a resin in the glass composition is prevented.

WO2005/110695 discloses glass fibers that can maintain the transparency of a molded product after being reinforced with fibers and increase the refractive index to a level that is substantially the same as the refractive index of polycarbonate resin. A glass fiber-reinforced polycarbonate resin molded product using the same is also disclosed.

Japanese Laid-Open Patent Publication No. 2006-22235 discloses a polycarbonate resin composition having superior transparency and mechanical strength and including a glass filler having a refractive index that is substantially the same as that of polycarbonate resin.

Japanese Laid-Open Patent Publication No. 2006-22236 discloses a polycarbonate resin composition having superior transparency and mechanical strength and including a glass filler having a refractive index that is substantially the same as that of polycarbonate resin.

Japanese Laid-Open Patent Publication No. 2007-153729 discloses a glass filler for a polycarbonate resin which filler can maintain the transparency of a molded product after reinforcing the glass filler and increase the refractive index to a level that is substantially the same as the refractive index of polycarbonate resin. A polycarbonate resin composition using the glass filler is also disclosed.

Japanese Laid-Open Patent Publication No. 61-14152 discloses glass fibers having properties that are suitable for use as a reinforcing material for electrical applications. It discloses that a typical glass fiber having a typical glass composition has a refractive index of 1.57.

Japanese Laid-Open Patent Publication No. 2005-97080 discloses glass flakes having sufficient heat resistance and satisfactory moldability. The glass flakes are mixed in resin molded products, paints, makeup materials, and ink.

Patent Document 1: Japanese Examined Patent Publication No. 62-1338
Patent Document 2: Japanese Laid-Open Patent Publication No. 5-155638
Patent Document 3: WO2005/110695
Patent Document 4: Japanese Laid-Open Patent Publication No. 2006-22235
Patent Document 5: Japanese Laid-Open Patent Publication No. 2006-22236
Patent Document 6: Japanese Laid-Open Patent Publication No. 2007-153729
Patent Document 7: Japanese Laid-Open Patent Publication No. 61-14152
Patent Document 8: Japanese Laid-Open Patent Publication No. 2005-97080

DISCLOSURE OF THE INVENTION

However, the prior art has the problems described below.

In the glass fiber composition disclosed in Japanese Examined Patent Publication No. 62-1338, the content percentage of alkali components is high. Thus, the alkali components may cause hydrolytic reaction that decreases the molecular weight of the polycarbonate resin. The glass fiber compositions contain three percent by mass or greater of zirconium oxide ($ZrO_2$). The glass fiber compositions also contain zinc oxide (ZnO) as an arbitrary component.

The glass composition disclosed in Japanese Laid-Open Patent Publication No. 5-155638 contains zinc oxide (ZnO) as an arbitrary component. The examples of the publication, except for example 3, disclose a glass composition containing zinc oxide (ZnO). Further, there is a problem in that the Abbe number is large.

In the glass fibers disclosed in WO2005/110695, diboron trioxide ($B_2O_3$) and/or titanium oxide ($TiO_2$) are essential components. In the publication, each example of glass fibers that does not contain diboron trioxide ($B_2O_3$) does contain zinc oxide (ZnO) or barium oxide (BaO). Further, there is a problem in that $\Delta T$ is small and the moldability is insufficient.

In the glass filler disclosed in claim 1 of Japanese Laid-Open Patent Publication No. 2006-22235, diboron trioxide ($B_2O_3$) is contained as an essential component, and zinc oxide (ZnO) is contained as an arbitrary component. The glass filler of claim 2 in the publication contains zinc oxide (ZnO) as an arbitrary component. Further, there is a problem in that $\Delta T$ is small and the moldability is insufficient.

In the glass filler disclosed in claim 1 of Japanese Laid-Open Patent Publication No. 2006-22236, diboron trioxide ($B_2O_3$) is contained as an essential component, and zinc oxide (ZnO) is contained as an arbitrary component. The glass filler of claim 2 in the publication contains zinc oxide (ZnO) as an arbitrary component. Further, there is a problem in that ΔT is small and the moldability is insufficient.

In the glass filler disclosed in Japanese Laid-Open Patent Publication No. 2007-153729, zirconium oxide ($ZrO_2$) is an essential component. Further, there is a problem in that ΔT is small and the moldability is insufficient.

Since $B_2O_3$, ZnO, and F are adequately volatile components, these components may be diffused when glass is melted. The glass composition may change due to such diffusion. This makes it difficult to control the quality of the glass composition. Moreover, $B_2O_3$ and F may cause corrosion in the wall of a kiln or a furnace and shorten the life of the kiln or furnace.

Since $ZrO_2$ is a component that enhances devitrification, it is preferable that the content of $ZrO_2$ be smaller to prepare glass that is not devitrified. Further, when a large amount of $ZrO_2$ is contained, the melting point of glass becomes high, and it becomes difficult to uniformly melt glass.

The glass fibers disclosed in Japanese Laid-Open Patent Publication No. 61-14152 do not contain $B_2O_3$, ZnO, and F. However, the glass fibers have a refractive index of 1.57. Thus, the glass filler does not necessarily have a satisfactory level in the aspect of whether it maintains the transparency of the polycarbonate resin.

Japanese Laid-Open Patent Publication No. 2005-97080 also does not contain $B_2O_3$, ZnO, and F. However, the glass flakes optionally contain $TiO_2$ but does not contain $ZrO_2$. This makes it difficult to adjust the refractive index of glass and improve the melting characteristics and chemical durability.

It is an object of the present invention to provide a glass composition having a stable quality that is optimal for use as a glass filler mixed with polycarbonate resin. A further object of the present invention is to provide a glass composition that reduces the load on a glass preparation apparatus.

To achieve the above object, the present invention provides a glass composition comprising, expressed in percent by mass, $50 \leq SiO_2 \leq 60$, $8 \leq Al_2O_3 \leq 15$, $0 \leq MgO \leq 10$, $5 \leq CaO < 21$, $0 < SrO+BaO \leq 25$, $10 < MgO+SrO+BaO \leq 30$, $0 \leq Li_2O+Na_2O+K_2O < 2$, $2 < TiO_2 \leq 10$, and $0 \leq ZrO_2 < 2$. The glass composition is substantially free from $B_2O_3$, F, and ZnO.

A glass composition according to the present invention does not contain an adequately volatile component. This facilitates control of the glass composition and obtains stable quality. Further, the devitrification temperature is lower than the working temperature. This facilitates the formation of the glass filler. Moreover, the glass composition does not contain a component that would cause corrosion in the wall of a kiln or a furnace and shorten the life of the kiln or furnace. This reduces the load on the glass preparation apparatus.

The glass composition of the present invention has a small difference from polycarbonate resin in refractive index. Further, elution of alkali components is reduced, and the glass composition has superior chemical durability. Accordingly, when mixed with polycarbonate as a filler, properties of the polycarbonate resin such as the mechanical strength and heat resistance are improved.

BEST MODE FOR CARRYING OUT THE INVENTION

Figure 1A:
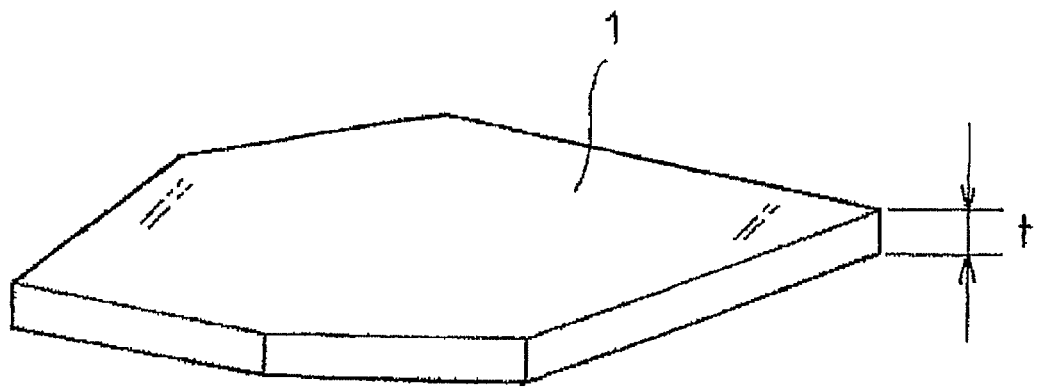
FIG. 1(A) is a schematic diagram showing a glass flake.

One embodiment of the present invention will now be discussed.

[Composition of Glass Composition]

The composition of a glass composition will now be discussed in detail.

($SiO_2$)

Silicon dioxide ($SiO_2$) is the main component that forms the skeleton of glass. Furthermore, silicon dioxide is a component that adjusts the devitrification temperature and viscosity of glass and improves the acid resistance. As long as the content of $SiO_2$ is 50 percent by mass or greater, the devitrification temperature is prevented from increasing, and devitrification-free glass may be easily prepared. Further, the acid resistance of glass may be improved. If the content of $SiO_2$ is 60 percent by mass or less, the melting point of glass becomes low and it becomes easy to uniformly melt the glass.

Accordingly, the lower limit for the content of $SiO_2$ is preferably 50 percent by mass or greater. More preferably, the lower limit for the content of $SiO_2$ is 52 percent by mass or greater, and further preferably 54 percent by mass or greater. It is most preferable that the lower limit of the content of $SiO_2$ be greater than 55 percent by mass. The upper limit for the content of $SiO_2$ is 60 percent by mass or less. More preferably, the upper limit for the content of $SiO_2$ is less than 59 percent by mass, and further preferably 58 percent by mass or less. The range for the content of $SiO_2$ is selected from any combination of these upper and lower limits.

($Al_2O_3$)

Aluminum oxide ($Al_2O_3$) is a component that forms the skeleton of glass. Further, aluminum oxide is a component that adjusts the devitrification temperature and viscosity of glass and improves the water resistance. On the other hand, $Al_2O_3$ is a component that lowers the acid resistance of glass. As long as the content of $Al_2O_3$ is 8 percent by mass or greater, adjustment of the devitrification temperature and viscosity and improvement of the water resistance are facilitated. If the content of $Al_2O_3$ is 15 percent by mass or less, the melting point of glass becomes low and it becomes easy to uniformly melt the glass. Additionally, the acid resistance of glass is improved.

Accordingly, the lower limit for the content of $Al_2O_3$ is preferably 8 percent by mass or greater. More preferably, the lower limit for the content of $Al_2O_3$ is 9 percent by mass or greater, and further preferably greater than 10 percent by mass. It is preferable that the upper limit of the content of $Al_2O_3$ be 15 percent by mass or less. More preferably, the upper limit for the content of $Al_2O_3$ is less than 13 percent by mass and further preferably 12 percent by mass or less. The range for the content of $Al_2O_3$ is selected from any combination of these upper and lower limits.

(MgO, CaO, SrO, BaO)

Magnesium oxide (MgO), calcium oxide (CaO), strontium oxide (SrO), and barium oxide (BaO) are components that adjust the devitrification temperature and viscosity of glass. Further, strontium oxide (SrO), and barium oxide (BaO) are components that adjust the refractive index of glass.

MgO may be optionally contained in the glass composition although it is preferable that the content be more than 0 percent by mass. It is more preferable that the content be 1 percent by mass or greater and most preferable that the content be 2 percent by mass or greater.

On the other hand, it is preferable that the upper limit for MgO be 10 percent by mass or less. More preferably, the upper limit is 8 percent by mass or less and further preferably 6 percent by mass or less. It is most preferable that the content be 5 percent by mass or less. As long as the content of MgO in the glass composition is 10 percent by mass or less, the devitrification temperature is prevented from increasing, and devitrification-free glass may be easily prepared. The range for the content of MgO is selected from any combination of these upper and lower limits.

When the content of CaO in the glass composition is 5 percent by mass or greater, the adjustment of the devitrification temperature and viscosity is facilitated. On the other hand, when the content of CaO is less than 21 percent by mass, the devitrification temperature is prevented from increasing, and devitrification-free glass may be easily prepared.

Accordingly, it is preferable that the lower limit for the content of CaO be 5 percent by mass or greater. More preferably, the lower limit is 10 percent by mass or greater and further preferably 12 percent by mass or greater. It is preferable that the upper limit for the content of CaO be less than 21 percent by mass. More preferably, the lower limit is 20 percent by mass or less and further preferably less than 18 percent by mass. The range for the content of CaO is selected from any combination of these upper and lower limits.

SrO may be optionally contained in the glass composition although it is preferable that the content be more than 0 percent by mass. It is more preferable that the content of SrO be greater than 5 percent by mass and most preferable that the content be greater than 10 percent by mass. On the other hand, it is preferable that the upper limit for the content of SrO be 20 percent by mass or less, and more preferably, 15 percent by mass or less. As long as the content of SrO is 20 percent by mass or less, the devitrification temperature is prevented from increasing, and devitrification-free glass may be easily prepared. The range for the content of SrO is selected from any combination of these upper and lower limits.

BaO may be optionally contained in the glass composition. It is preferable that the upper limit for the content of BaO be 20 percent by mass or less. It is more preferable that the content of BaO be 10 percent or less and further preferable that the content be 5 percent by mass or less. It is most preferable that BaO not be substantially contained. As long as the content of BaO is 20 percent by mass or less, the devitrification temperature is prevented from increasing, and devitrification-free glass may be easily prepared.

When the total content of SrO and BaO (SrO+BaO) in the glass composition is greater than 0 percent by mass, the adjustment of the devitrification temperature and viscosity is facilitated. On the other hand, when the total of (SrO+BaO) is 25 percent by mass or less, the devitrification temperature is prevented from increasing, and devitrification-free glass may be easily prepared. Accordingly, it is preferable that the lower limit for the content of the total of (SrO+BaO) be greater than 0 percent by mass. More preferably, the lower limit is greater than 5 percent by mass and further preferably greater than 10 percent by mass. It is preferable that upper limit for the content of the total of (SrO+BaO) be 25 percent by mass or less. More preferably, the content is 20 percent by mass or less and further preferably 15 percent by mass or less. The range for the content of the total of (SrO+BaO) is selected from any combination of these upper and lower limits.

When the total content of MgO and SrO (MgO+SrO) is greater than 10 percent by mass, the adjustment of the devitrification temperature and viscosity is facilitated. On the other hand, when the total of (MgO+SrO) is 30 percent by mass or less, the devitrification temperature is prevented from increasing, and devitrification-free glass may be easily prepared. Accordingly, it is preferable that the lower limit of (MgO+SrO) be greater than 10 percent by mass. More preferably, the lower limit is greater than 11 percent by mass and further preferably greater than 12 percent by mass. It is preferable that the upper limit of (MgO+SrO) be 30 percent by mass or less. More preferably, the content is 25 percent by mass or less and further preferably 20 percent by mass or less.

When the total content of MgO, SrO and BaO (MgO+SrO+BaO) in the glass composition is greater than 10 percent by mass, the adjustment of the devitrification temperature and viscosity is facilitated. On the other hand, when the total of (MgO+SrO+BaO) is 30 percent by mass or less, the devitrification temperature is prevented from increasing, and devitrification-free glass may be easily prepared. Accordingly, it is preferable that the lower limit for the content of the total of (MgO+SrO+BaO) be greater than 10 percent by mass. More preferably, the lower limit is greater than 11 percent by mass and further preferably greater than 12 percent by mass. It is preferable that the upper limit for the total of (MgO+SrO+BaO) be 30 percent by mass or less. More preferably, the content is 25 percent by mass or less and further preferably 20 percent by mass or less.

($Li_2O$, $Na_2O$, $K_2O$)

Alkali metal oxides ($Li_2O$, $Na_2O$, $K_2O$) are components that adjust the devitrification temperature and viscosity of glass and may be optionally contained. More preferably, the total content of alkali metal oxides ($Li_2O+Na_2O+K_2O$) that is contained is greater than 0 percent by mass.

On the other hand, it is preferable that the upper limit for the total of ($Li_2O+Na_2O+K_2O$) be less than 2 percent by mass. The upper limit is more preferably 1.5 percent by mass or less and further preferably less than 1 percent by mass. It is most preferable that the upper limit be 0.5 percent by mass or less. When the total of ($Li_2O+Na_2O+K_2O$) is less than 2 percent by mass, the glass transition temperature increases, and the heat resistance of glass is improved. Further, the working temperature increases relative to the devitrification temperature. This facilitates the preparation of devitrification-free glass. Furthermore, such a glass suppresses the elution of alkali ions. Thus, even when mixed as a filler, the molecular weight of polycarbonate resin is not decreased.

The range for the content of the total of ($Li_2O+Na_2O+K_2O$) is selected from any combination of these upper and lower limits.

($TiO_2$)

Titanium oxide ($TiO_2$) is a component that adjusts the refractive index of glass. The use of glass including a predetermined amount of $TiO_2$ as a filler maintains the transparency of a polycarbonate resin molded body. Further, $TiO_2$ is a component that improves the fusibility, chemical durability, and ultraviolet absorption property of glass. When the content of $TiO_2$ in the glass composition is greater than 2 percent by mass, adjustment of the refractive index is facilitated. When the content of $TiO_2$ is 10 percent by mass or less, the devitrification temperature is prevented from increasing, and devitrification-free glass may be easily prepared.

Accordingly, the lower limit for the content of $TiO_2$ is preferably greater than 2 percent by mass. The lower limit is more preferably 3 percent by mass or greater and further preferably 4 percent by mass or greater. It is most preferable that the lower limit be greater than 5 percent by mass. The upper limit for the content of $TiO_2$ is preferably 10 percent by mass or less and more preferably 8 percent by mass or less. The range for the content of $TiO_2$ is selected from any combination of these upper and lower limits.

(ZrO$_2$)

Zirconium oxide (ZrO$_2$) is a component that improves the fusibility and chemical durability of glass and may be optionally contained in the glass composition. It is preferable that the content of ZrO$_2$ be greater than 0 percent by mass. When the content of ZrO$_2$ in the glass composition is less than 2 percent by mass, the devitrification temperature is prevented from increasing, and devitrification-free glass may be easily prepared. Further, the melting temperature of glass becomes low and it becomes easy to uniformly melt the glass. Accordingly, the upper limit for the content of ZrO$_2$ is preferably less than 2 percent by mass. More preferably, the upper limit for the content of ZrO$_2$ is 1 percent by mass or less, and further preferably 0.5 percent by mass or less. The range for the content of ZrO$_2$ is selected from any combination of these upper and lower limits.

(Fe)

When present in glass, iron (Fe) normally exists in the state of Fe$^{3+}$ or Fe$^{2+}$. Fe$^{3+}$ is a component that improves the ultraviolet absorption property of glass. Fe$^{2+}$ is a component that improves the heat-ray absorption property of glass. Even when not intended to be contained, Fe from other industrial crude materials may be inevitably mixed with the glass composition. As long as the content of Fe is small, the coloring of glass may be prevented. The use of such a glass as a filler prevents the transparency of the polycarbonate resin molded product from being degraded.

Accordingly, it is preferable that the content of Fe in the glass composition be smaller. When converted into Fe$_2$O$_3$, it is preferable that the content of Fe be 0.5 percent by mass or less. It is more preferable that the content of Fe be 0.1 percent by mass or less and further preferable that the glass composition be substantially free from Fe.

(SO$_3$)

Although Sulfur Trioxide (SO$_3$) is not an Essential component, it may be used as a fining agent. When using a sulfate crude material, the sulfur trioxide in the glass composition may become 0.5 percent by mass or less.

(B$_2$O$_3$)

In the Present Invention, the Glass Composition is substantially free from diboron trioxide (B$_2$O$_3$).

(F)

In the present invention, the glass composition is substantially free from fluorine (F).

(ZnO)

In the present invention, the glass composition is substantially free from zinc oxide (ZnO).

In the present invention, the phrase of "substantially free from a substance" would mean that the substance is not intentionally contained in the glass composition except when, for example, it is inevitably mixed from other industrial crude materials. More specifically, such a situation refers to a state in which the content of the substance in the glass composition is less than 0.1 percent by mass. This content is preferably less than 0.05 percent by mass and more preferably less than 0.03 percent by mass.

As described above, in the glass composition of the present invention, the essential components are SiO$_2$, Al$_2$O$_3$, CaO, TiO$_2$ and at least one of SrO and BaO. The glass composition of the present invention may be formed from only these essential components. In addition to these essential components, the glass composition of the present invention may contain MgO, alkali metal oxides (Li$_2$O, Na$_2$O, K$_2$O), ZrO$_2$, and SO$_3$ when needed.

[Physical Properties of Glass Composition]

The physical properties of a glass composition according to the present invention will now be discussed in detail.

(Melting Property)

The temperature of when the viscosity of molten glass is 1000 dPa·sec (1000 poise) is referred to as the working temperature of the glass and is most optimal for the forming of glass. When preparing glass flakes and glass fibers, as long as the working temperature of glass is 1100° C. or greater, variations in the thicknesses of the glass flakes and diameters of the glass fibers may be decreased. Further, as long as the working temperature is 1300° C. or less, the cost of fuel required to melt glass may be reduced. Further, the glass preparation apparatus is less corroded by heat. This prolongs the life of the apparatus.

Accordingly, the lower limit of the working temperature is preferably 1100° C. or greater, and more preferably 1150° C. or greater. The upper limit of the working temperature is preferably 1260° C. or less. The upper limit is more preferably 1250° C. or less, and further preferably 1240° C. or less. The upper limit is most preferably 1230° C. or less. The range for the working limit is selected from any combination of these upper and lower limits.

As the temperature difference $\Delta T$, which is measured by subtracting the devitrification temperature from the working temperature increases, devitrification is less likely to occur during glass forming, and homogeneous glass may be prepared with a high yield.

Accordingly, $\Delta T$ is preferably 0° C. or greater and more preferably 20° C. or greater. It is further preferable that $\Delta T$ be 40° C. or greater, and most preferable that $\Delta T$ be 60° C. or greater. However, it is preferable that $\Delta T$ be less than 150° C. to facilitate preparation of the glass composition. It is further preferable that $\Delta T$ be 100° C. or less.

Devitrification refers to a situation in which crystals generated and grown from a base material of molten glass become turbid. Glass prepared from such a base material of molten glass may include crystallized agglomerates. Thus, such glass would not be preferable for use as a filler for polycarbonate resin.

(Optical Property)

If the glass filler and the polycarbonate resin have the same refractive index, light is not scattered at the interface of the glass filler and polycarbonate resin. This maintains the transparency of the polycarbonate resin. Therefore, it is preferable that the refractive index of the glass composition be close to the refractive index of the polycarbonate resin. The refractive index $n_d$ of polycarbonate resin measured with the helium d line (wavelength 587.6 nm) is normally about 1.585. Accordingly, it is preferable that the refractive index $n_d$ of the glass composition be 1.575 to 1.595. The refractive index $n_d$ is more preferably 1.580 to 1.590, and further preferably 1.582 to 1.588. The refractive index $n_d$ is most preferably 1.583 to 1.587.

The difference in the refractive index $n_d$ between the glass composition and polycarbonate resin is preferably 0.010 or less and more preferably 0.005 or less. The difference in the refractive index $n_d$ is further preferably 0.003 or less and most preferably 0.002 or less.

The refractive index of the glass filler is preferably close to the refractive index of polycarbonate resin. The refractive index $n_D$ of polycarbonate resin measured with the sodium D line (wavelength 589.3 nm) is normally about 1.585. Accordingly, it is preferable that the refractive index $n_D$ of the glass filler be 1.575 to 1.595. The refractive index $n_D$ is more preferably 1.580 to 1.590, and further preferably 1.582 to 1.588. The refractive index $n_D$ is most preferably 1.583 to 1.587.

The difference in the refractive index $n_D$ between the glass filler and polycarbonate resin is preferably 0.010 or less and more preferably 0.005 or less. The difference in the refractive index $n_d$ is further preferably 0.003 or less and most preferably 0.002 or less.

The Abbe number is a measure indicating the dispersion of a transparent body such as glass and is an inverse of dispersive power. If the glass filler and polycarbonate resin have Abbe numbers that are close to each other, coloring does not occur in the polycarbonate resin, and transparency may be maintained. It is thus preferable that the Abbe number of the glass composition be close to the Abbe number of the polycarbonate resin. The Abbe number $v_d$ for the polycarbonate resin is normally about 30. Accordingly, the Abbe number $v_d$ for the glass composition is preferably 60 or less and more preferably 57 or less. The Abbe number $v_d$ for the glass composition is further preferably 55 or less.

(Chemical Durability)

A glass composition having superior chemical durability, such as acid resistance, water resistance, and alkali resistance, may be obtained as long as it is within the range of a glass composition according to the present invention. Accordingly, a glass filler formed from a glass composition according to the present invention is mixed with the polycarbonate resin in a desirable manner.

[Process for Preparing Glass Filler]

A glass composition according to the present invention may be formed into a glass filler in the form of glass flakes, chopped strands, milled fibers, glass particles, and glass beads.

Figure 1B:
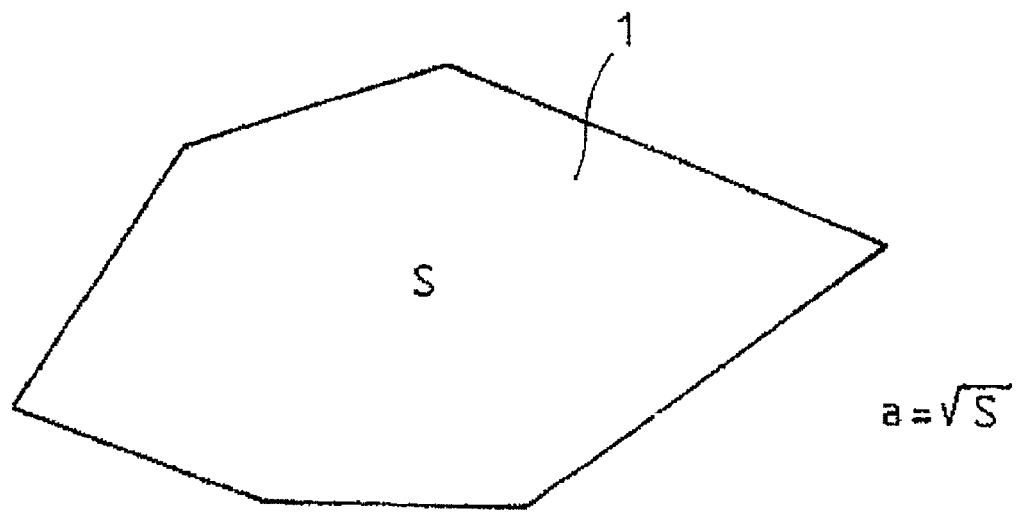
FIG. 1(B) is a diagram illustrating how to obtain the average particle diameter of a glass flake.

FIG. 1 is a schematic diagram showing a glass flake. A glass flake 1 is a piece of thin flake-shaped particle having an average thickness t of 0.1 to 15 μm and an aspect ratio (average particle diameter a/average thickness t) of 2 to 1000 (refer to FIG. 1(A)). Here, the average particle diameter a is defined as the square root of the area S of the glass flake 1 in a plan view (refer to FIG. 1(B)).

Figure 2:
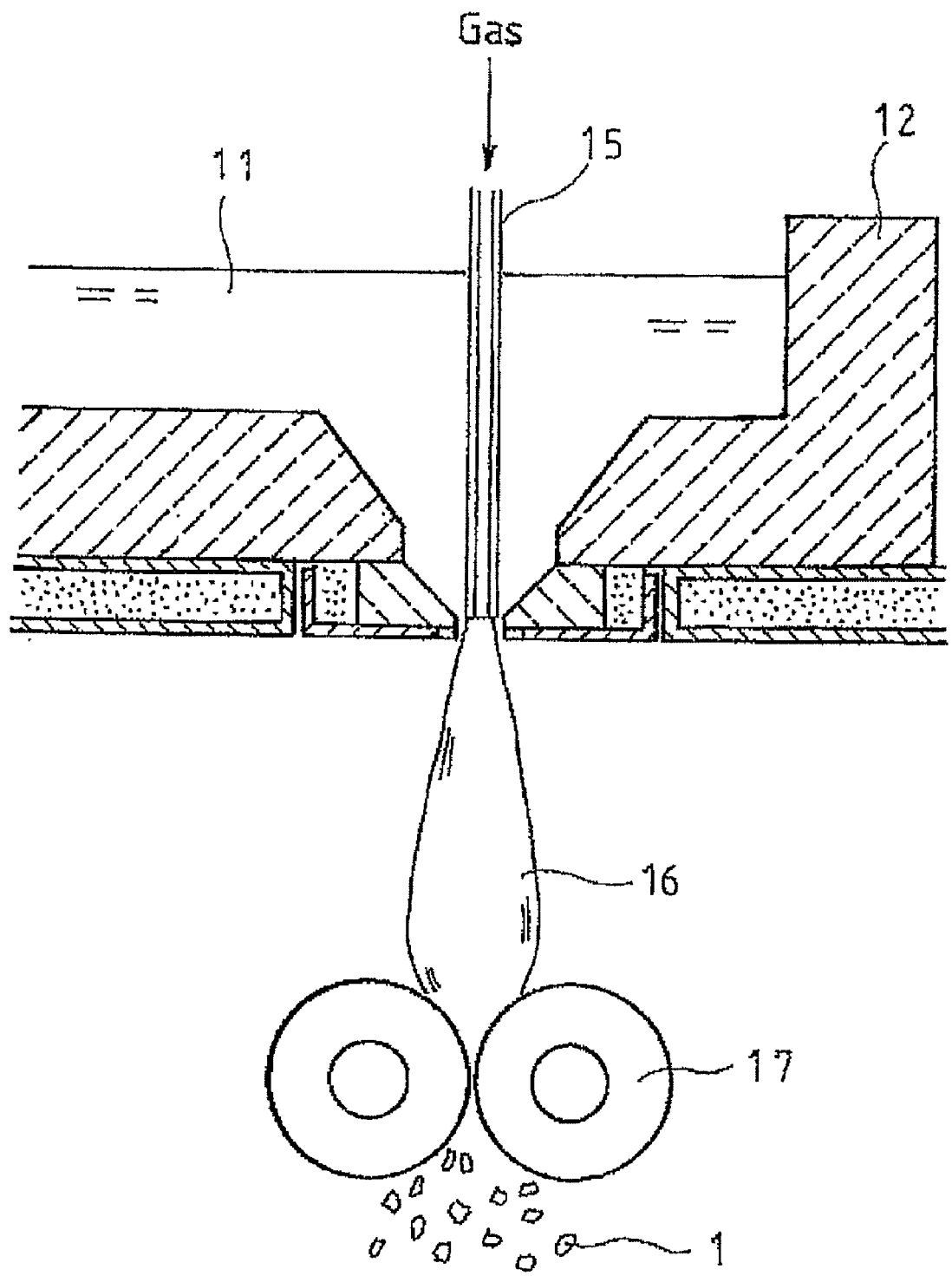
FIG. 2 is a schematic diagram showing a glass flake preparation apparatus.

Glass flakes may be prepared, for example, by using an apparatus illustrated in FIG. 2. A molten glass base material 11, which is melted in a fire-retardant furnace basin 12, is inflated into the form of a balloon by gas, which is delivered into a blow nozzle 15, to form a hollow glass film 16. The hollow glass film 16 is crushed by pressure rolls 17 to form glass flakes 1.

A chopped strand is a glass fiber having dimensions in which the fiber diameter is 1 to 50 μm and the aspect ratio (fiber length/fiber diameter) is 2 to 1000.

Figure 3:
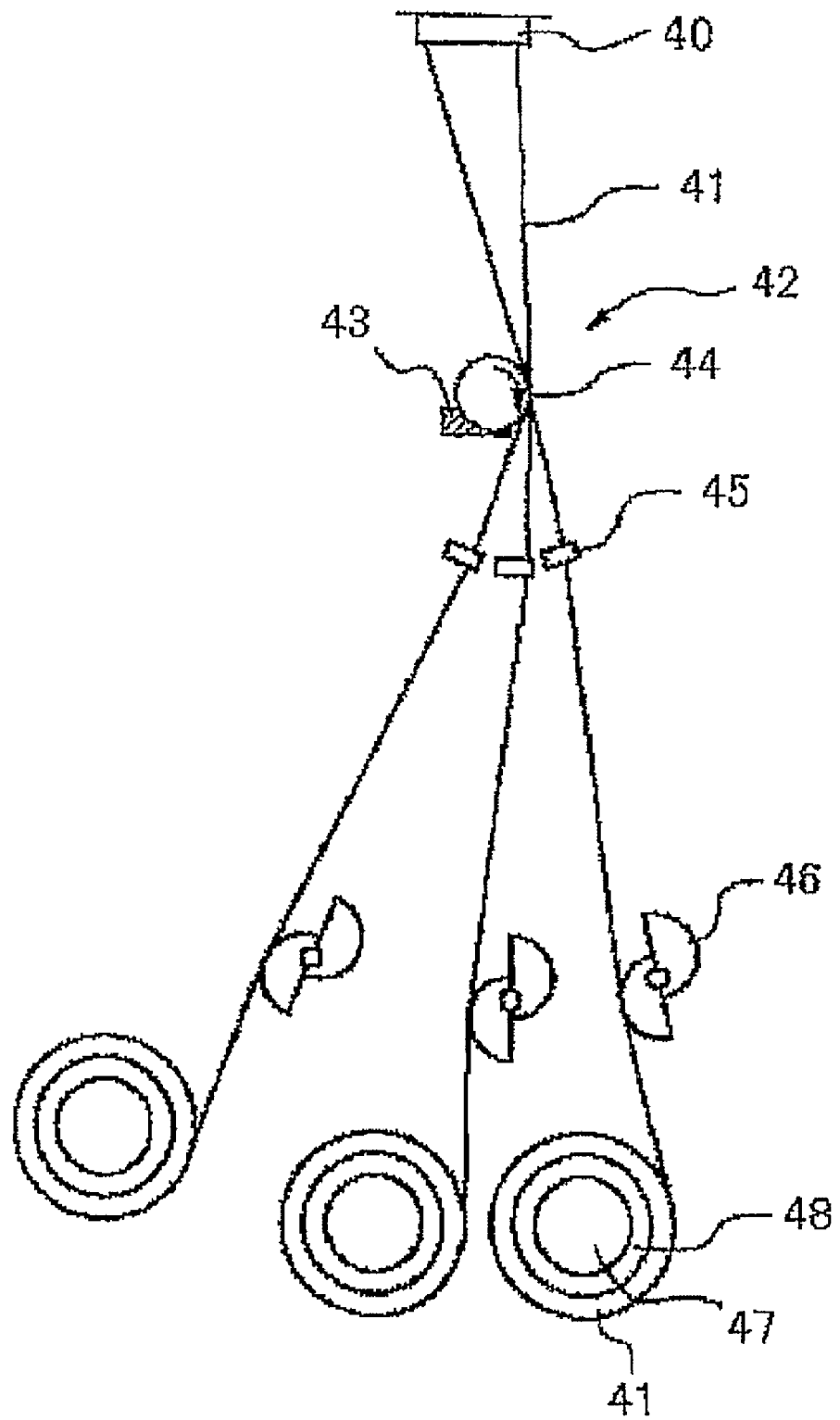
FIG. 3 is a schematic diagram of a spinning device for a chopped strand.
Figure 4:
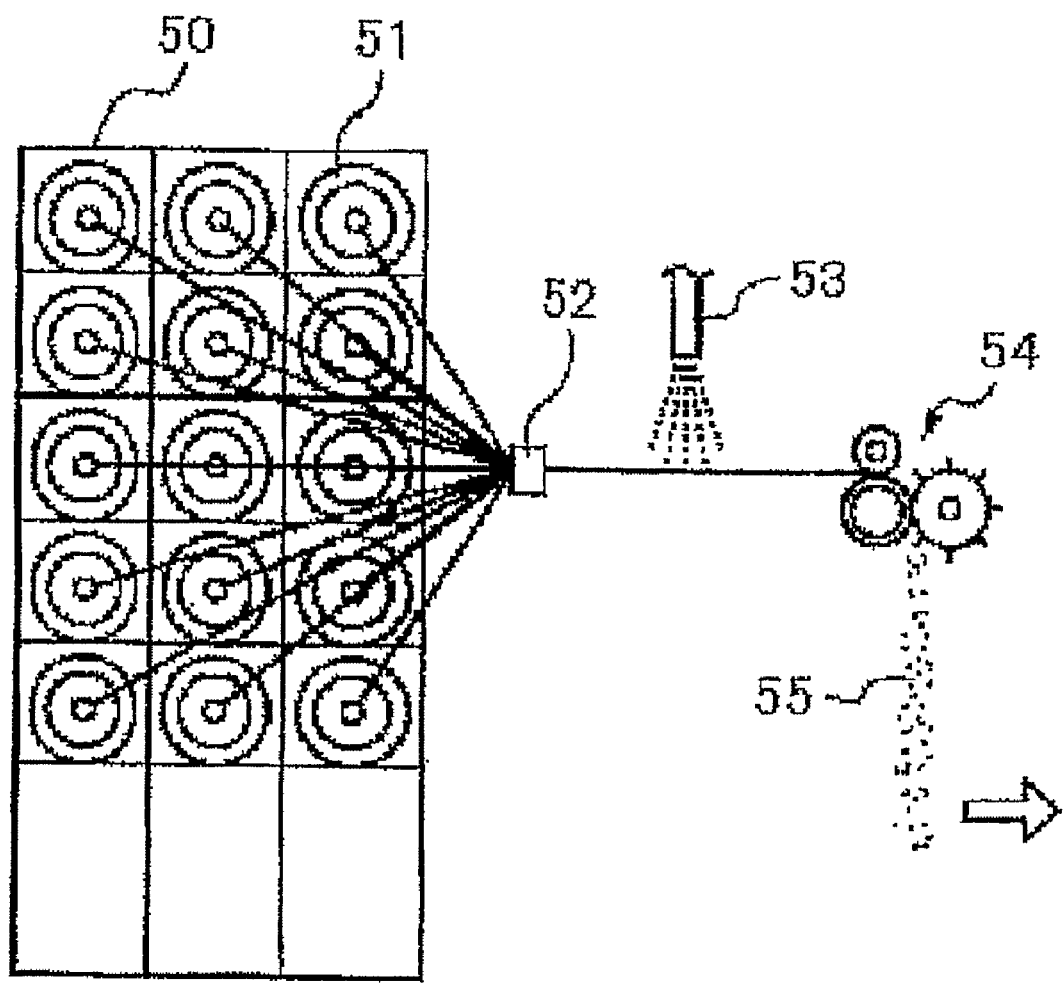
FIG. 4 is a schematic diagram of a preparation device for a chopped strand.

Chopped strands may be prepared, for example, by using an apparatus that is illustrated in FIGS. 3 and 4.

A glass base material, which is melted in a fire-retardant furnace basin, is drawn out of a bushing 40, which has a bottom portion including a large quantity of (e.g., 2400) nozzles, to form a large quantity of glass filaments 41. A coolant is blasted onto the glass filaments 41. Then, a binder applicator 42 applies a binder (binding agent) to the glass filament. The large quantity of glass filaments 41, to which the binder is applied, is bound into, for example, three strands, each including approximately 800 filaments. Each strand is wound onto a cylindrical tube 48, which is fitted to a collet 47 while being traversely swung by a traverse finger 46. Then, the cylindrical tube 48 on which the strand is wound is removed from the collet 46 to obtain a cake (wound strand body) 51.

Next, a bundling guide 52 draws out strands from the cakes 51, which are accommodated in a creel 50, and bundles the strands into a strand bundle. A spray device 53 then sprays water or a treatment liquid onto the strand bundle. Further, a cutting device 54 cuts the strand bundle to obtain chopped strands 55.

A milled fiber is a glass fiber having dimensions in which the fiber diameter is 1 to 50 μm and the aspect ratio (fiber length/fiber diameter) is 2 to 500. Such a milled fiber may be prepared through a known process.

It is preferable that the glass particles used as a glass filler have an average particle diameter of 1 to 500 μm. The average particle diameter of a glass particle is defined as the diameter of a spherical body having the same volume as the glass particle. Such glass particles may be prepared through a known process.

It is preferable that the glass beads used as a glass filler have an average particle diameter of 1 to 500 μm. The average particle diameter of a glass particle is defined as the diameter of a spherical body having the same volume as the glass bead. Such glass beads may be prepared through a known process.

[Polycarbonate Resin Composition]

A polycarbonate resin composition having superior properties is obtained by mixing a glass filler formed from a glass composition according to the present invention with a polycarbonate resin. The glass filler formed from a glass composition according to the present invention has a refractive index, the difference from polycarbonate resin of which is small. Further, elution of alkali components from the glass filler is reduced, and the glass filler has superior chemical durability. Accordingly, the obtained polycarbonate resin composition has substantially the same transparency as polycarbonate resin and has mechanical strength and heat resistance that are superior to polycarbonate resin.

A polycarbonate resin composition may be prepared through a known process. More specifically, a mixing machine may be used to heat polycarbonate resin so that it undergoes fusion kneading with glass filler. The polycarbonate resin that is used is known in the art. The form of the glass filler is not limited to one type and may be a mixture of more than one type. To improve the properties of the polycarbonate resin composition, various types of coupling agents and additive agents may be mixed as required. Further, it is preferable that the temperature for fusion kneading be less than or equal to the heat resistance temperature of polycarbonate resin.

Such a polycarbonate resin may be molded into a molded product that is optimal for use in an electrical device, an automobile component, construction material, and the like. The molding may be performed through known processes, such as extrusion molding, injection molding, press molding, sheet molding which employs the calendar process, and the like. It is preferable that the heating temperature during molding be less than or equal to the heat resistance temperature of polycarbonate resin.

The present invention will now be discussed in further detail through examples and comparative examples.

Examples 1 to 9, Comparative Examples 1 to 10

To obtain the compositions shown in tables 1 and 2, general glass crude materials such as silica sand were blended so as to prepare batches of glass compositions for each example and comparative example. Each batch was heated with an electric furnace to 1400° C. to 1600° C. and melted and then kept in the same state for about four hours until the compositions became homogeneous. Then, the melted glass was poured on a steel plate and gradually cooled to normal temperature in the electric furnace to obtain glass compositions.

For the glass prepared in such a manner, the density of the glass was measured by means of the Archimedean method.

Further, the relationship between viscosity and temperature was obtained using a known platinum ball-pulling method, and the working temperature was calculated based on the result. The platinum ball-pulling method is a process in which a platinum ball is immersed in molten glass and the relationship of the acting load (resistance) when pulling up the platinum ball at an equal velocity motion and the gravity or buoyancy acting on the platinum ball is applied to the Stokes' law, which indicates the relationship between the viscosity and descending velocity of a fine particle falling in a fluid, to measure the viscosity.

The glass was crushed into fragments having a particle diameter of 1.0 to 2.8 mm and the fragments were placed on a platinum boat and heated for two hours in an electric furnace having a temperature gradient (900 to 1400° C.) to obtain the devitrification temperature from the maximum temperature of the electric furnace in correspondence with the crystallization location. The temperature of each location in the electric furnace was measured and obtained beforehand, and the glass arranged at a predetermined location was heated to that temperature.

A Pulfrich refractometer was used to obtain the refractive index of the glass composition in which the refractive index $n_d$ for the d line (wavelength 587.6 nm), the refractive index $n_F$ for the F line (wavelength 486.1 nm), and the refractive index $n_c$ for the C line (wavelength 656.3 nm) were obtained. An immersion liquid process was performed on glass flakes to obtain the refractive index $n_D$ for the D line (wavelength 589.3 nm).

The Abbe number was obtained from the refractive indexes of the glass composition using the equation of $v_d=(n_d-1)/(n_F-n_c)$. In this equation, $n_d$ is the refractive index for the d line (wavelength 587.6 nm), $n_F$ is the refractive index for the F line (wavelength 486.1 nm), and $n_c$ is the refractive index for the C line (wavelength 656.3 nm).

The measurement results are shown in tables 1 and 2. Each of the values shown in the tables indicates the glass composition in percent by mass. Further, as described above, $\Delta T$ is the temperature difference measured by subtracting the devitrification temperature from the working temperature.

TABLE 1

| Components [mass %] | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| $SiO_2$ | 54.95 | 52.63 | 52.19 | 55.19 | 54.97 | 54.89 | 56.47 | 54.90 | 54.95 |
| $Al_2O_3$ | 11.97 | 11.46 | 11.37 | 12.02 | 11.97 | 11.96 | 10.53 | 11.96 | 11.97 |
| MgO | 2.81 | — | 2.67 | 2.74 | 2.73 | 2.79 | 3.04 | 2.81 | 2.81 |
| CaO | 14.17 | 13.57 | 13.45 | 13.82 | 13.77 | 14.05 | 15.34 | 14.16 | 14.15 |
| SrO | 10.99 | 17.44 | — | 10.72 | 10.68 | 10.91 | 11.91 | 10.99 | 10.99 |
| BaO | — | — | 15.46 | — | — | — | — | — | — |
| SrO + BaO | 10.99 | 17.44 | 15.46 | 10.72 | 10.68 | 10.91 | 11.91 | 10.99 | 10.99 |
| MgO + SrO | 13.80 | 17.44 | 2.67 | 13.46 | 13.41 | 13.70 | 14.95 | 13.80 | 13.80 |
| MgO + SrO + BaO | 13.80 | 17.44 | 18.13 | 13.46 | 13.41 | 13.70 | 14.95 | 13.80 | 13.80 |
| $Li_2O$ | — | — | — | 0.37 | — | — | — | — | — |
| $Na_2O$ | — | — | — | — | 0.76 | — | — | — | — |
| $K_2O$ | — | — | — | — | — | 0.29 | — | — | — |
| $Li_2O + Na_2O + K_2O$ | — | — | — | 0.37 | 0.76 | 0.29 | — | — | — |
| $TiO_2$ | 5.11 | 4.90 | 4.86 | 5.14 | 5.12 | 5.11 | 2.71 | 4.99 | 5.11 |
| $ZrO_2$ | — | — | — | — | — | — | — | 0.19 | — |
| $Fe_2O_3$ | — | — | — | — | — | — | — | — | 0.02 |
| Working temp. [° C.] | 1228 | 1221 | 1236 | 1214 | 1224 | 1229 | 1227 | 1229 | 1227 |
| Devitrification temp. [° C.] | 1151 | 1132 | 1176 | 1120 | 1156 | 1158 | 1159 | 1152 | 1155 |
| $\Delta T$ [° C.] | 77 | 89 | 60 | 94 | 68 | 71 | 68 | 77 | 72 |
| Refractive index $n_d$ | 1.590 | 1.596 | 1.593 | 1.591 | 1.588 | 1.588 | 1.582 | 1.588 | 1.590 |
| Abbe number $v_d$ | 52 | 54 | 54 | 54 | 54 | 55 | 57 | 55 | 54 |

TABLE 2

| Components [mass %] | Com. Ex. 1 | Com. Ex. 2 | Com. Ex. 3 | Com. Ex. 4 | Com. Ex. 5 | Com. Ex. 6 | Com. Ex. 7 | Com. Ex. 8 | Com. Ex. 9 | Com. Ex. 10 |
|---|---|---|---|---|---|---|---|---|---|---|
| $SiO_2$ | 59.00 | 57.90 | 51.84 | 52.00 | 45.43 | 64.63 | 56.22 | 54.04 | 56.59 | 55.49 |
| $Al_2O_3$ | 12.10 | 11.50 | 9.99 | 9.90 | 11.87 | 12.06 | 5.88 | 16.36 | 12.32 | 10.34 |
| MgO | 3.40 | 3.50 | 3.24 | 1.80 | 3.78 | 1.82 | 3.28 | 2.47 | 10.48 | 2.19 |
| CaO | 22.60 | 21.50 | 9.84 | 16.70 | 19.06 | 9.20 | 16.55 | 12.44 | 4.02 | 11.06 |
| SrO | — | — | 24.24 | 4.50 | 14.79 | 7.13 | 12.84 | 9.66 | 11.32 | 8.58 |
| BaO | — | 1.00 | — | 10.10 | — | — | — | — | — | — |
| SrO + BaO | — | 1.00 | 24.24 | 14.60 | 14.79 | 7.13 | 12.84 | 9.66 | 11.32 | 8.58 |
| MgO + SrO | 3.40 | 3.50 | 27.48 | 6.30 | 18.57 | 8.95 | 16.12 | 12.13 | 21.80 | 10.77 |
| MgO + SrO + BaO | 3.40 | 4.50 | 27.48 | 16.40 | 18.57 | 8.95 | 16.12 | 12.13 | 21.80 | 10.77 |
| $Li_2O$ | — | — | — | — | — | — | — | — | — | — |
| $Na_2O$ | 0.90 | 0.30 | 0.45 | 0.70 | — | — | — | — | — | — |
| $K_2O$ | — | 0.50 | 0.28 | 0.40 | — | — | — | — | — | — |
| $Li_2O + Na_2O + K_2O$ | 0.90 | 0.80 | 0.73 | 1.10 | — | — | — | — | — | — |
| $TiO_2$ | 1.50 | 0.80 | 0.12 | — | 5.07 | 5.16 | 5.23 | 5.03 | 5.27 | 12.34 |
| $ZrO_2$ | — | 3.00 | — | 3.90 | — | — | — | — | — | — |
| $Fe_2O_3$ | 0.20 | — | — | — | — | — | — | — | — | — |
| Working temp. [° C.] | 1232 | 1245 | 1213 | 1231 | 1129 | 1416 | 1173 | 1271 | 1247 | 1227 |
| Devitrification temp. [° C.] | 1210 | 1176 | 1162 | 1224 | 1276 | 1398 | 1275 | 1303 | 1282 | 1346 |
| $\Delta T$ [° C.] | 22 | 69 | 51 | 7 | −147 | 18 | −102 | −32 | −35 | −119 |
| Refractive index $n_d$ | 1.573 | 1.578 | 1.581 | 1.589 | 1.625 | 1.553 | 1.601 | 1.581 | 1.577 | 1.612 |
| Abbe number $v_d$ | 58 | 59 | 59 | 60 | 52 | 56 | 53 | 54 | 57 | 43 |

In examples 1 to 9, the working temperature of the glass composition was 1214° C. to 1236° C. This is a preferable temperature for forming the glass filler.

In examples 1 to 9, ΔT (working temperature–devitrification temperature) of the glass composition was 60° C. to 94° C. This is the temperature difference in which devitrification does not occur in the glass in the preparation process for the glass filler.

In examples 1 to 9, the refractive index $n_d$ of the glass composition was 1.582 to 1.596. The glass composition of example 2 was in the range for a glass composition according to the present invention but outside the range of the refractive index according to claim 2.

In examples 1 to 9, the Abbe number $v_d$ of the glass compositions was 52 to 57.

The glass composition of comparative example 1 was the same as the glass composition of the example described in Japanese Laid-Open Patent Publication No. 61-14152, and the contents of CaO, the total of (SrO+BaO), the total of (MgO+SrO+BaO), and $TiO_2$ were outside the range of a glass composition according to the present invention. The refractive index $n_d$ of the glass composition was 1.573 and outside the range of the refractive index according to claim 2. The Abbe number $v_d$ of the glass composition was 58 and thus greater than the Abbe number $v_d$ of the glass compositions of examples 1 to 9.

The glass composition of comparative example 2 was the same as the glass composition of sample 3 in the example described in Japanese Laid-Open Patent Publication No. 5-155638, and the contents of CaO, the total of (MgO+SrO+BaO), $TiO_2$, and $ZrO_2$ were outside the range of a glass composition according to the present invention. The Abbe number $v_d$ of the glass composition was 59 and thus greater than the Abbe number $v_d$ of the glass compositions of examples 1 to 9.

The glass composition of comparative example 3 was the same as the glass composition of example 4 described in Japanese Laid-Open Patent Publication No. 2005-97080, and the content of $TiO_2$ was outside the range of a glass composition according to the present invention. The Abbe number $v_d$ of the glass composition was 59 and thus greater than the Abbe number $v_d$ of the glass compositions of examples 1 to 9.

The glass composition of comparative example 4 was the same as the glass composition of example 9 described in Japanese Laid-Open Patent Publication No. 2007-153729, and the contents of $TiO_2$ and $ZrO_2$ were outside the range of a glass composition according to the present invention. The glass composition had a ΔT of 7° C., which is smaller than the ΔT of the glass compositions of examples 1 to 9. The Abbe number $v_d$ of the glass composition was 60 and thus greater than the Abbe number $v_d$ of the glass compositions of examples 1 to 9.

In the glass composition of comparative example 5, the content of $SiO_2$ was outside the range of a glass composition according to the present invention. The glass composition had a ΔT of –147° C., which is smaller than the ΔT of the glass compositions of examples 1 to 9. The refractive index $n_d$ of the glass composition was 1.625. Thus, the difference from the refractive index $n_d$ of polycarbonate resin was greater than the glass compositions of examples 1 to 9.

In the glass composition of comparative example 6, the contents of $SiO_2$ and the total of (MgO+SrO+BaO) were outside the range of a glass composition according to the present invention. The working temperature of the glass composition was 1416° C. and thus greater than the working temperature of the glass compositions of examples 1 to 9. The refractive index $n_d$ of the glass composition was 1.553. Thus, the difference from the refractive index $n_d$ of polycarbonate resin was greater than the glass compositions of examples 1 to 9.

In the glass composition of comparative example 7, the content of $Al_2O_3$ was outside the range of a glass composition according to the present invention. The glass composition had a ΔT of –102° C., which is smaller than the ΔT of the glass compositions of examples 1 to 9. The refractive index $n_d$ of the glass composition was 1.601. Thus, the difference from the refractive index $n_d$ of polycarbonate resin was greater than the glass compositions of examples 1 to 9.

In the glass composition of comparative example 8, the content of $Al_2O_3$ was outside the range of a glass composition according to the present invention. The working temperature of the glass composition was 1271° C. and thus greater than the working temperature of the glass compositions of examples 1 to 9. The glass composition had a ΔT of –32° C., which is smaller than the ΔT of the glass compositions of examples 1 to 9.

In the glass composition of comparative example 9, the contents of MgO and CaO were outside the range of a glass composition according to the present invention. The glass composition had a ΔT of –35° C., which is smaller than the ΔT of the glass compositions of examples 1 to 9.

In the glass composition of comparative example 10, the content of $TiO_2$ was outside the range of a glass composition according to the present invention. The glass composition had a ΔT of –119° C., which is smaller than the ΔT of the glass compositions of examples 1 to 9. The refractive index $n_d$ of the glass composition was 1.612. Thus, the difference from the refractive index $n_d$ of polycarbonate resin was greater than the glass compositions of examples 1 to 9.

As described above, as long as a glass composition according to the present invention is used, it is apparent that the glass composition has a refractive index suitable for mixing with polycarbonate resin as a filler. Further, as long as a glass composition according to the present invention is used, it is apparent that the glass composition has melting properties that are suitable for forming a glass filler.

Examples 10 to 18

The glass compositions of examples 1 to 9 were melted again in an electric furnace and then cooled and formed into pellets. The pellets were then fed into the preparation apparatus illustrated in FIG. 2 to prepare the glass flakes of examples 10 to 18, which have an average thickness of 0.5 to 1 μm. The refractive indexes of the glass flakes were measured. The measurement results are shown in table 3.

The glass flakes (glass filler) were mixed with polycarbonate resin to prepare polycarbonate resin compositions.

TABLE 3

|  | Ex. 10 | Ex. 11 | Ex. 12 | Ex. 13 | Ex. 14 | Ex. 15 | Ex. 16 | Ex. 17 | Ex. 18 |
| --- | --- | --- | --- | --- | --- | --- | --- | --- | --- |
| Refractive index $n_D$ | 1.584 | 1.591 | 1.588 | 1.585 | 1.582 | 1.582 | 1.576 | 1.584 | 1.584 |

Examples 19 to 27

The glass compositions of examples 1 to 9 were melted again in an electric furnace and then cooled and formed into pellets. The pellets were then fed into the preparation apparatus illustrated in FIGS. 3 and 4 to prepare the chopped strands of examples 19 to 27, which have an average fiber diameter of 10 to 20 μm and a length of 3 mm.

The chopped strands (glass filler) were mixed with polycarbonate resin to prepare polycarbonate resin compositions.

The invention claimed is:

1. A glass composition comprising, expressed in percent by mass:

$50 \leqq SiO_2 \leqq 60$;
$8 \leqq Al_2O_3 \leqq 15$;
$0 \leqq MgO \leqq 10$;
$5 \leqq CaO < 21$;
$5 < SrO+BaO \leqq 25$;
$10 < MgO+SrO+BaO \leqq 30$;
$0 \leqq Li_2O+Na_2O+K_2O < 2$;
$2 < TiO_2 \leqq 10$; and wherein the content of SrO is greater than 5 percent by mass and the glass composition is substantially free from $B_2O_3$, F, ZnO, and $ZrO_2$, and wherein the glass composition has a refractive index $n_d$ of 1.575 or greater and 1.595 or less.

2. The glass composition according to claim 1, wherein the glass composition has an Abbe number $v_d$ of 60 or less.

3. The glass composition according to claim 1, wherein the glass composition has a working temperature of 1300° C. or less.

4. The glass composition according to claim 1, wherein the glass composition has a temperature difference ΔT, which is obtained by subtracting the working temperature of the glass composition from the devitrification temperature, of 0° C. or greater.

5. A polycarbonate resin composition comprising:
polycarbonate resin; and
a glass filler;
wherein the glass filler includes the glass composition according to claim 1; and
the glass filler is in the form of at least one selected from a glass flake, a chopped strand, a milled fiber, a glass particle, and a glass bead.

6. A glass filler for a polycarbonate resin, the glass filler prepared by once melting the glass composition according to claim 1 and then processing the glass composition to have a dimension in a predetermined range.

7. The glass composition according to claim 1, wherein the content of SrO is greater than 10 percent by mass.

* * * * *